United States Patent [19]

Baarman et al.

[11] Patent Number: 5,491,996
[45] Date of Patent: Feb. 20, 1996

[54] METHOD AND APPARATUS FOR MANUFACTURING A STABILIZER BAR

[75] Inventors: Göran Baarman, Ekenäs; Bengt Willberg, Högbacka, both of Finland

[73] Assignee: Imatra Steel OY AB, Imatra, Finland

[21] Appl. No.: 934,446

[22] PCT Filed: Mar. 5, 1991

[86] PCT No.: PCT/FI91/00063

§ 371 Date: Oct. 5, 1992

§ 102(e) Date: Oct. 5, 1992

[87] PCT Pub. No.: WO91/13707

PCT Pub. Date: Sep. 19, 1991

[30] Foreign Application Priority Data

Mar. 5, 1990 [FI] Finland ................................. 901113

[51] Int. Cl.$^6$ ........................................... B21D 7/16
[52] U.S. Cl. ................................. 72/128; 72/369
[58] Field of Search ..................... 72/128, 308, 310, 72/311, 369; 280/665, 688, 689, 721, 789, 790, 796, 798, 756

[56] References Cited

U.S. PATENT DOCUMENTS

| | | | |
|---|---|---|---|
| 2,286,893 | 6/1942 | Boissou | 72/369 |
| 3,902,344 | 9/1975 | Stuart | 72/128 |
| 4,061,005 | 12/1977 | Kawanami et al. | 72/369 |
| 4,151,732 | 5/1979 | Hofstede et al. | 72/128 |
| 4,195,506 | 4/1980 | Kawanami et al. | 72/128 |
| 4,254,649 | 3/1981 | Cervenka et al. | 72/128 |
| 4,372,576 | 2/1983 | Inoue | 280/689 |
| 4,378,122 | 3/1983 | Ohno et al. | 280/689 |
| 4,412,442 | 11/1983 | Kawanami et al. | 72/128 |

FOREIGN PATENT DOCUMENTS 0092815  11/1983  European Pat. Off. ............ 280/689

*Primary Examiner*—Daniel C. Crane
*Assistant Examiner*—Thomas C. Schoeffler
*Attorney, Agent, or Firm*—Omri M. Behr; Matthew J. McDonald

[57] ABSTRACT

A stabilizer bar or a similar metallic tube product for vehicles, has a central portion and at least two bent portions forming legs. The bar includes a thick-walled metallic tube having in the central portion a wall thickness and outside diameter in a ratio amounting to at least $\frac{1}{10}$. This tube has an outside wall portion bent with a restricted thinning, ranging from about 5 to 15%. The bent portions are bent with an average bending radius of curvature in the range from about 1.4 to 2.1 times the outside diameter of the tube. Apparatus and methods can manufacture stabilizer bars or similar tubular metallic products of the foregoing type. For example, a method includes the steps of fitting to a bending arm one end of the thick-walled metallic tube. An inside wall portion of the tube has a radial spacing from a bending center of curvature, no greater than the length of the bending arm. The tube and the heating zone move relatively, with the heating zone advancing along the tube. Circular movement of the bending arm is resisted with a force sufficient to displace the flexure plane (separating compression zone from tension zone) radially outward from the center of curvature and to thin the outside wall of the metallic tube by about 5 to 15%. Resistance of the circular movement can be preformed with a gear and gear rack.

12 Claims, 4 Drawing Sheets

METHOD AND APPARATUS FOR MANUFACTURING A STABILIZER BAR

BACKGROUND OF THE INVENTION

The present invention relates to a stabilizer bar. The stabilizer bar is intended for use in vehicles, particularly in heavy vehicles. A stabilizer bar of the indicated kind comprises a metallic tube having a central portion and at least two bent portions forming legs, each leg of the tube forming and an angle with the central portion of the tube.

The invention further relates to a method, for manufacturing stabilizer bars or similar tubular metallic products. According to such a method, the ends of a metallic tube are bent at a suitable angle in relation to the central portion of the tube, the ends of both the legs formed being subsequently provided with suitable means for fastening of the stabilizer bar to the chassis (frame) of the vehicle.

Finally, the invention also relates to an apparatus, for manufacturing stabilizer bars.

Stability improving stabilizer bars are commonly used in trucks, especially in heavy trucks having a total weight of up to 58 tons. In order to increase the payload of the trucks, the maximum gross vehicle weights permitted for trucks have been raised at the same time as the vehicle weights have decreased. In order to maintain the suspension comfort, air suspension or, alternatively, parabolic springs with few leaves have been introduced in trucks. This development has resulted in the center of gravity of the vehicles being shifted upwards, which already by itself increases the instability of the vehicles, in particular since the springs have been dimensioned more and more only for the purpose of suspension. The requirement for good stability, that is anti-roll stiffness, has remained and even been increased due to increasing speeds. This is the reason for wanting to eliminate the instabilizing effects caused by the above-mentioned reasons by increasing the stiffness of the stabilizer bars.

Stabilizer bars for heavy trucks have mostly been manufactured from solid round steel bars. So far the diameters of the bars have been about 50 mm. The requirement for increased stiffness is leading to a need for diameters up to 70 mm. This 40% increase of the diameter is leading to a 100% increase of the weight of stabilizers bar made from steel bars. Because more and more axles of the vehicles are nowadays provided with stabilizer bars, the requirement for increasing roll stiffness is leading to an unaccepted growth of the vehicle weight.

One possible solution to this problem is the use of tubes instead of solid bars as raw materials for the stabilizer bars. Tubular products have so far been produced on a smaller scale for the indicated purpose. Although it is possible, in theory, to attain a weight reduction of up to 50%, there are several reasons why the tubular stabilizer bars have not been a success on the market.

The stress on a stabilizer bar is highest in the bends, which means that the shape of the bends is crucial. The utilized tube bending methods, primarily different forging methods, have given rise to weak bends due to unfavourable distribution of the material in the bends. It has also been difficult to achieve bends with sufficient short radii (narrow bends) while maintaining the circular cross sections of the bends.

Thus, by using conventional forging methods, it is not possible to obtain bends which simultaneously fulfil the requirements for the desired bending radii, the circular shape of the cross section and the distribution of the material in the bends. This is why the technical-economic competitiveness of the tubular stabilizer bars has not been strong enough for the tubular stabilizer bars to gain on the solid ones on the market.

The present invention aims at eliminating the drawbacks of the previous methods and at providing an entirely novel tubular stabilizer bar. The invention also aims at providing a novel method and a novel apparatus for manufacturing these kinds of stabilizer bars.

By means of experiments, we have been able to ascertain that satisfactory results can be achieved by using a bending method known as induction bending, provided that the bending process is operated so that a combination of bending and controlled upsetting of the inside of the bends takes place at the same time. This way a cross section with a very little deviation from the circular shape can be obtained at the same time as the stretching of the outer wall of the bend can be reduced.

For the purpose of this invention, thick-walled tubes are utilized, the tubes being shaped by the induction bending technique to stabilizer bars.

SUMMARY OF THE INVENTION

According to the invention, one end of the tube which is to be bent is clamped to a bending arm which is pivotally mounted for circular movement about the center of curvature (bending center) of the intended bend. In a heating zone displaced a certain distance from the pivoting point of the bending arm, a narrow zone of the tube is heated with an induction coil to austenitic state which enables plastic deformation. The heated part of the tube is mainly located where the longitudinal axis of the tube and its normal through the bending center are crossing. The tube and the heating zone are moved in relation to each other in such a way that the heating zone advances along the tube from one end of the tube to the other. Narrow parts or bands of the tube are successively heated and the tube is bent by the circular movement of the bending arm.

In order to achieve bends strong enough it is, according to the invention, important during the bending to attenuate the circular movement of the bending arm with a force that will move the flexure plane of the tube in radial direction outwards from the central line of the tube sufficiently to keep the thinning of the outer wall of the tube bends of the metallic tube in the range from about 5 to 15%, preferably at about 10%.

By means of the described method it is thus possible to produce stabilizer bars with narrow bends from thick-walled tubes having the above-mentioned thinning of the outside wall of the tube bend.

For the purposes of the present application, the expression "thick-walled tubes" denotes tubes made from hardening and tempering steel or from steel with similar properties having a good strength. The ratio between the wall thickness and outer diameter of the tube is at least about 1:10, preferably from 1:8 to 1:7.

Narrow bends are bends having an average radius from about 1 to about 2.5 times the outer diameter of the tube, preferably the average bending radius is from 1.4 to 2.1 times the diameter of the tube. It is important to have narrow bends on the stabilizer bars according to the invention, because there is limited space for the bends in the chassis constructions of trucks.

The flexure plane designates the longitudinal plane of the tube where neither elongation nor upsetting takes place.

The "relative motion of the tube and the heating zone in relation to each other" includes the cases wherein the tube is adapted for movement whereas the position of the heating zone is fixed or essentially fixed and vice versa, as well as the cases wherein both of them are moved.

According to a preferred embodiment, the relative movement of the heating zone and the tube in relation to each other, is achieved by placing the bending arm and the heating zone on a transport means essentially movable in the longitudinal direction of the tube. The position of the central portion of the tube is fixed on the base of the bending device. In order to bend a tube, the transport means is pushed towards the clamped central portion of the tube.

By means of this embodiment it is possible to produce the two bended legs of a stabilizer bar in one phase of work by arranging at each end of the tube a device of the above-indicated kind comprising a transport means, on which the bending arm and the induction heating device are arranged.

According to another preferred embodiment the necessary relative movement of the heating zone and the tube in relation to each other can be achieved by clamping the tube on a transport means which is moved essentially in the longitudinal direction of the tube past a rigidly mounted induction heating zone. The bending arm is also rigidly mounted on the base of the bending device.

According to a preferred embodiment, the force for attenuating (resisting) the circular movement of the bending arm is created with a gear mechanism consisting of a gear connected to the bending arm and a gear rack cooperating with the gear and rigidly connected to the tube. The radius of the gear is selected such that it is larger than the radius of the bend of the tube. Normally, for achieving the desired restricted stretching of the outside wall, the ratio between the radius of the tube and the bending radius is in the range from about 1.05 to 1.2. In the first of the above-mentioned embodiments, the gear rack is rigidly mounted, for instance, on the base of the bending device, or on clamping means which are used for fixing the position of the central portion of the tube. In the second embodiment, the gear rack is connected to the transport means on which the tube is clamped. In both cases the length of the gear rack is at least as large as the length of the bent part of the tube measured along the gear radius periphery.

Considerable benefits are obtained by means of the invention. By utilizing the described modified induction bending technique for bending stabilizer bars intended for heavy trucks, it is possible to manufacture stabilizer bars while maximizing the utilization of the starting material. The properties of these stabilizer bars, whose bends have been produced as described below, in spite of a material saving of up to 50%, almost equal to the properties of solid stabilizer bars.

Static twisting tests of stabilizer bars with bends made according to the invention show that their roll stiffness is 15% higher than the roll stiffness of stabilizer bars whose bends have been produced by conventional tube bending techniques. This improvement is due to the improved distribution of the material in the bends. There are also clear differences as regards the fatigue strength to the advantage of the present method.

According to the invention, a stabilizer bar of ordinary dimensions typically has a roll stiffness which, depending on the outer diameter of the tube, is from about 200 to 300 N/mm for thin tubes (outer diameter 55 mm, inner diameter 40 mm) and from about 900 to 1400 N/mm for rough tubes (outer diameter 80 mm, inner diameter 70 mm).

As far as properties such as twist stiffness, maximal allowed stress and fatigue strength are concerned, it is of paramount importance to maintain a circular cross section of throughout the whole bend. By means of the present invention, a maximum of 1% ovality is achieved on the circular cross section of the tube bends.

The largest load on a stabilizer bar is concentrated on the upset inside walls of the bend. Tests carried out have shown that tubes bent by the present method are provided with an increased upsetting of the inner wall, which is of decisive significance to the strength. In an optimal bend, the thickness of the inner wall is increased by up to 60%. It has also been found that metal tubes bent by induction heating without using the above-described guidance of the material, give rise to stabilizer bars, which have unacceptably extensive thinning of the outer walls at the narrow bends required for stabilizer bars.

BRIEF DESCRIPTION OF THE DRAWING

In the following, the invention will be examined in more detail with the aid of four drawings.

DESCRIPTION OF THE PREFERRED
EMBODIMENTS

Figure 1:
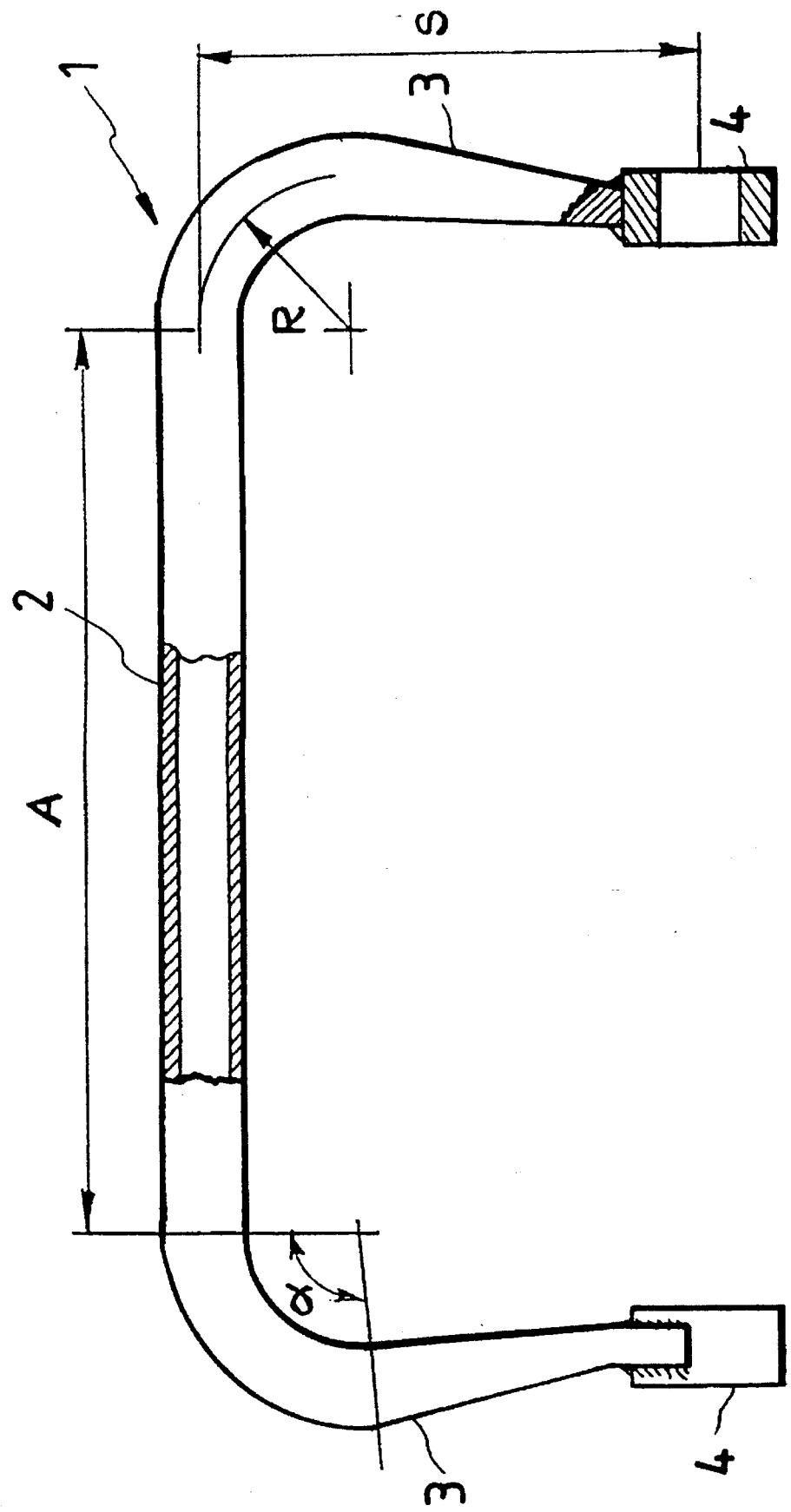
FIG. 1 shows a partly open sideview section of a tubular stabilizer bar produced according to the invention.

A tubular stabilizer bar 1 produced in accordance with the invention (FIG. 1) comprises a U-shaped tube with a straight central portion 2, each end of which is provided with a leg 3 forming an angle with the straight portion 2. The length A of the central portion 2, which in this case is essentially straight, is from 500 mm to 1500 mm, whilst the lengths S of the legs are from 300 to 500 mm. The legs 3 are bent from the same tube such that there is a tube bend between the straight portion and each leg, normally having a bending angle of about 70° to 120° and a bending radius R of 60 to 200 mm. Tubular stabilizer bars in accordance with the invention are produced from seamless rolled tube or from a material having at least equal characteristics. Preferably, tubes made from hardening and tempering steel are used. Typical dimensions of the utilized tubes are as follows: outer diameter: 40 to 100 mm and wall thickness: 0.1 to 0.2 times the diameter. The ends of the legs 3 are provided with tubular bushings 4 attached by welding. The bushings 4 are used for mounting the stabilizer bars between the wheel axles and the frame of the vehicle.

Figure 2:
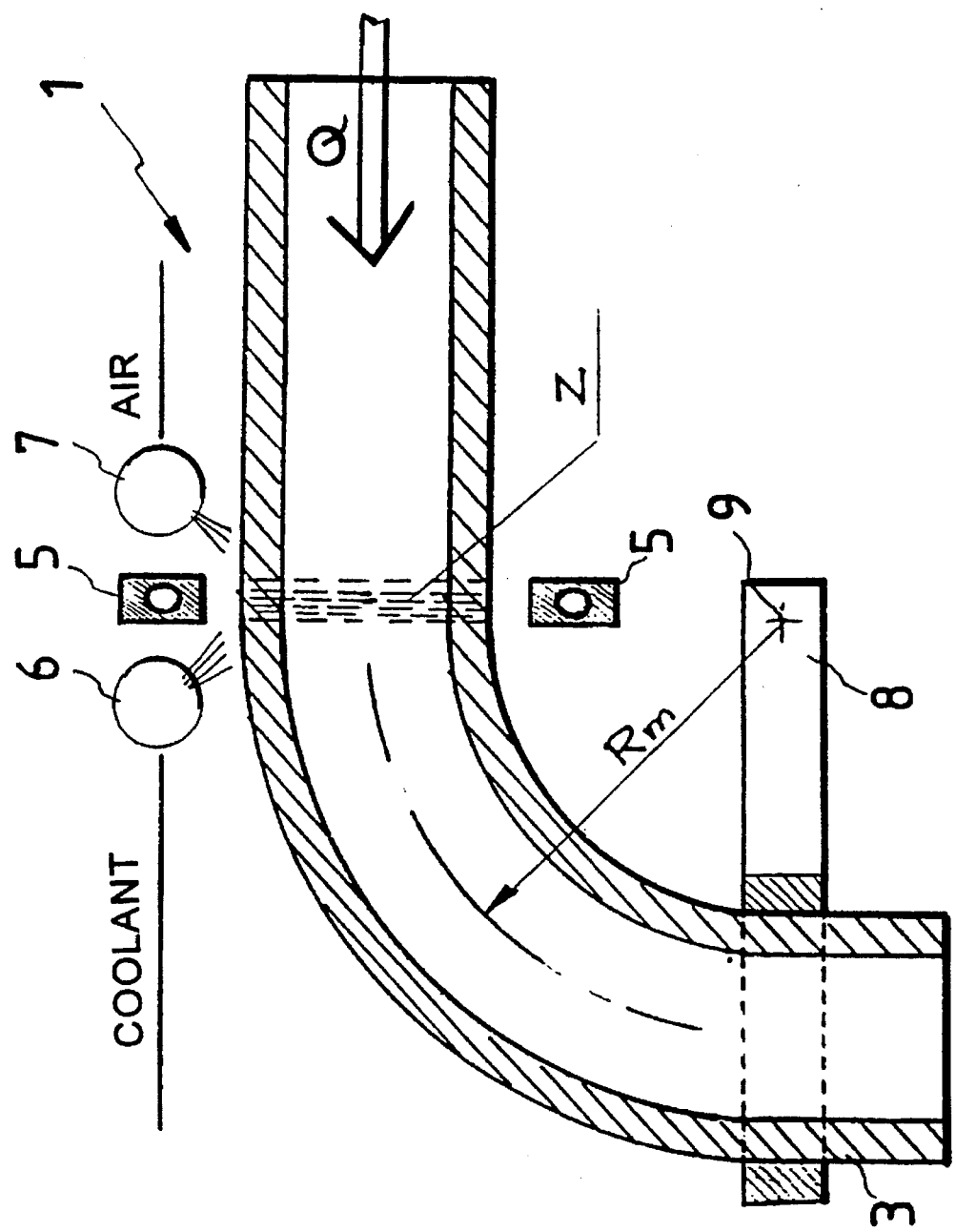
FIG. 2 depicts a sideview section of a part of a tube bent with induction heating.
Figure 3:
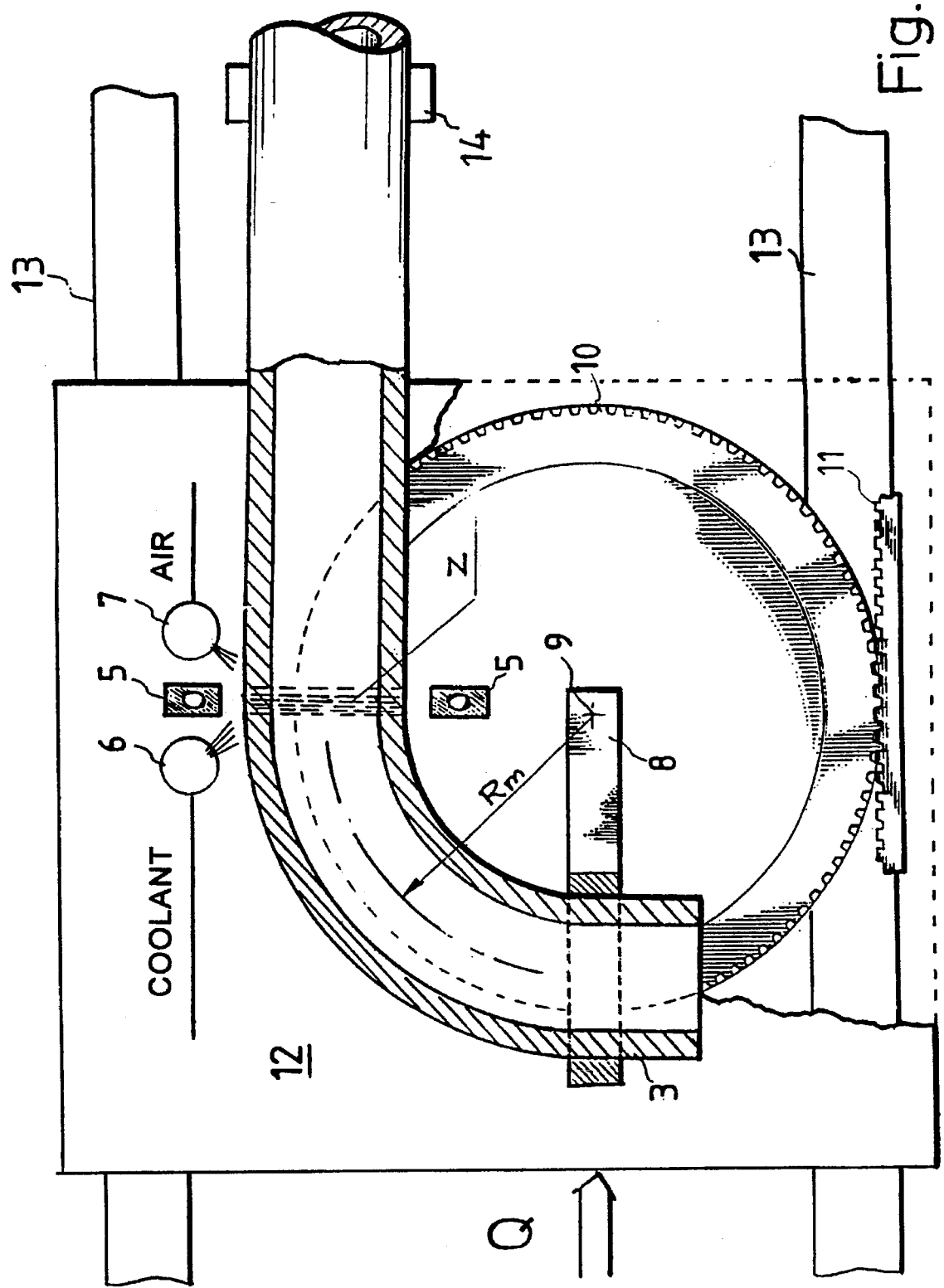
FIG. 3 portrays a sideview of a similar section of a tube in the process of being bent with an apparatus according to the invention.

FIGS. 2 and 3 illustrate in more detail the principles of a tube induction bending operation carried out in accordance with the invention.

The arrow Q represents the direction of the relative movement of the tube 1 to be worked up in relation to the induction heating device 5, 6 and 7. The cross section of a narrow zone Z of the tube 1 is continuously heated with an induction coil 5. In order to limit the length of the zone Z, the material is gradually cooled with a cooling medium, usually water, applied with jets 6 on the tube. An air curtain is created with air jets 7 on the tube in order to avoid the cooling medium from spreading out against the feeding direction of the tube. The induction heating coil 5 is fed with high frequency alternating current providing magnetic fields around the coil, which fields induce eddy currents in the metal tube 1. Thus, the surface layer of the tube is functioning as an electric resistance which is being heated by the eddy currents. The penetration depth of the current into the metal depends on the frequency of the magnetic field; low frequency gives a great penetration depth, whilst high frequency generates eddy currents on the surface. The depth of the zone that is heated by induction depends not only on the frequency of the electric induction power supply but also on the speed of the input and the removal of heat as well as on the moving speed of the tube. Normally, a surface temperature of the tube in the range from about 800° to 900° C. is aimed at. This temperature range is sufficient for transforming the surface region of the steel into austenitic state which will allow for plastic deformation.

In one embodiment, the device in accordance with the invention comprises a longitudinal base or a frame, the induction heating device 5, 6 and 7 and the bending arm 8 being mounted on a movable carriage 12, which can be moved along skid rails 13 mounted on said frame. The carriage 12 is driven by a hydraulic cylinder (not shown) having one end connected to the carriage and the other end to the frame. The hydraulic cylinder is equipped with conduits for supplying hydraulic fluid from a power source. The bending arm 8 is equipped with clamping means for clamping the front end of the tube 1. The bending arm 8 is pivotally mounted in the bending center of the bow 9 and its turning radius $R_m$ corresponds to the bending radius of the tube. The central portion of the tube 1, which is clamped to the frame with clamping means 14 having shaped jaws, is displaced a distance from the carriage 12 and the skid rails 13. The carriage provides the above-mentioned feeding speed and feeding force Q. The feeding force Q is dependent on the cross section of the tube and on the forging properties of the material.

In front of the induction heating unit 5, 6 and 7, there are guiding rolls mounted on both sides of the tube. The purpose of the guiding rolls is to guide the tube in a correct position through the heating device 5, 6 and 7.

According to another embodiment, the induction heating device 5, 6 and 7 is arranged at one end of the frame whilst a feeding device is fitted on the frame. The feeding device comprises a movable carriage which can be moved longitudinally on skid rails mounted on the frame. The driving device comprises, in this case too, a hydraulic cylinder connected to a source of hydraulic fluid. The carriage is equipped with clamping jaws for fastening of one end of the tube on the carriage.

In both embodiments, the hydraulic cylinders can be adapted for pushing the carriage with an essentially constant force during the bending process. In the first embodiment above, the force is directed towards the carriage at the same time as the induction heating is started. Thus, the carriage will start to move towards the central portion of the tube, which is clamped to the frame, only when the tube wall has reached a sufficiently high temperature.

The front end of the tube 1 is clamped to the bending arm 8 which is pivotally mounted on the frame.

Conventionally, the bending arm 8 is pivotally mounted for free turning movement as shown in FIG. 2. In that case, the feeding force Q is a function of the bending work. In a stabilizer bar where the material distribution has a decisive bearing on both the roll stiffness and the fatigue strength, the movement of the bending arm must, during the bending process, be related to the feeding movement caused by the push force Q.

During bending of a tube, the outer wall of the tube T is thinned by a value $t_y$ and the inner wall is, correspondingly, thickened by a value $t_i$. If the bending arm 8 is allowed to move freely, the flexure plane of the tube will lie in the center of the tube and comprise an arc having a radius $R_1$. The length $L_1$ of the arc is the same as the length of the material $L_1$ needed for the bend.

According to the invention, the flexure plane is moved towards the outside wall of the bend. In other words, the radius is elongated to $R_2$, resulting in a decrease in the value of $t_y$ and an increase in the value of $t_i$. The length $L_2$ of the arc represents the material needed.

Equations for calculations:

$$t_i (\%) = 100 \times \left( \frac{R_2}{R_i + 0.5\,T} \right)$$

$$t_y (\%) = 100 \times \left( \frac{R_2}{R_i + D - 0.5\,T} \right)$$

With these equations the upsetting of the inside wall and the thinning of the outside wall can be calculated.

In order to increase the wall thickness of the inside wall of the bends 8, the circular movement of the bending arm is attenuated and the material is thus fed by force to the bending zone. As mentioned above, in an optimal bend the wall thickness can be increased by up to 60%.

Figure 4:
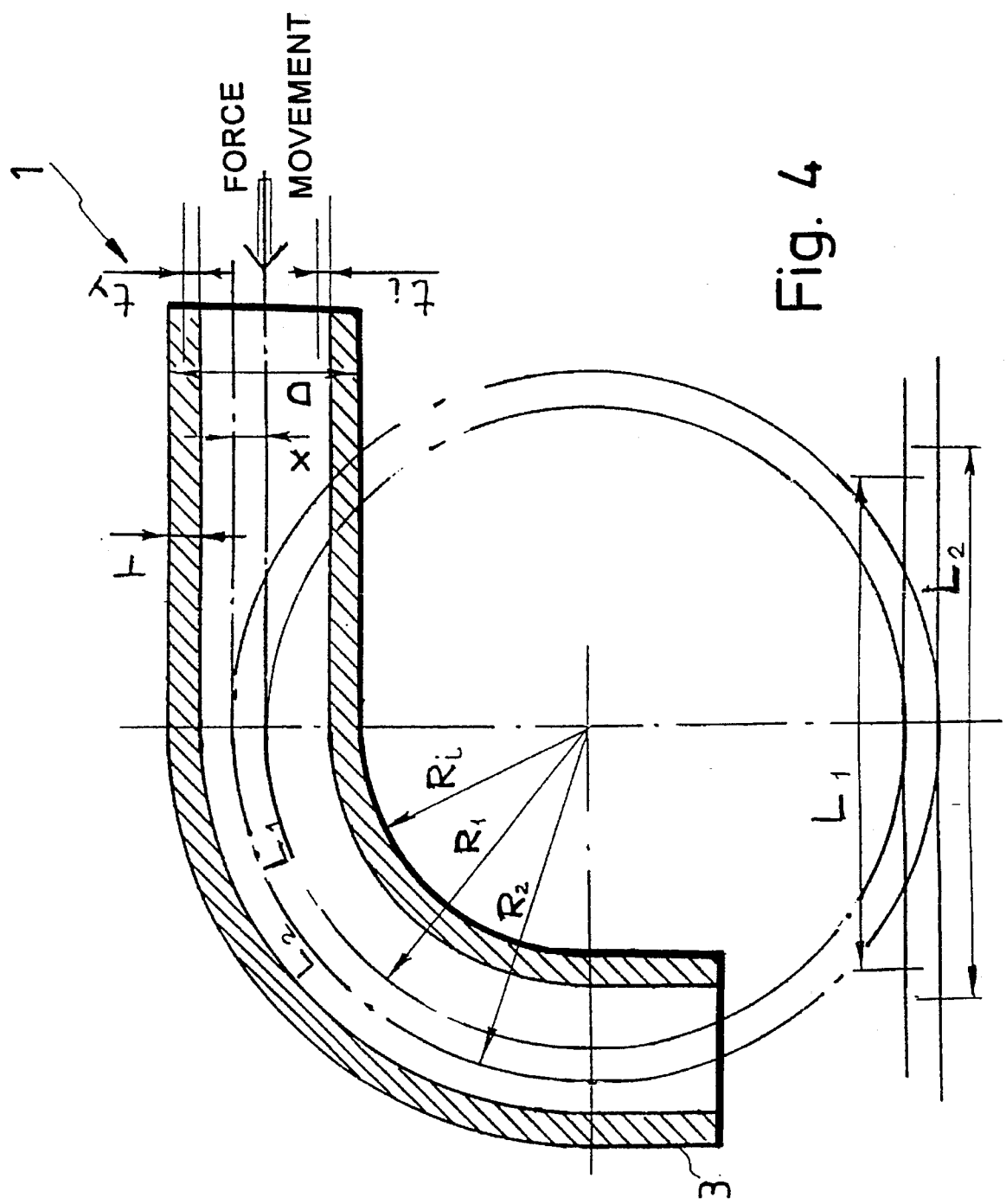
FIG. 4 illustrates the idea of moving the flexure plane in accordance with the invention.

According to a preferred embodiment of the invention, a gear 10 is pivotally mounted to the same point as the radial bending arm 8 and is rigidly connected to it. Normally, the gear is mounted on the same shaft as the bending arm. The radius $R_2$ of the gear (FIG. 4) is larger than the bending radius of the bend. The difference between the radius of the gear and the radius of the bend have to correspond to the desired shift of the flexure plane outwards of the center of curvature. The gear 10 is cooperating with a gear rack 11. In the first of the above-mentioned embodiments, wherein the bending arm 8 and the induction heating zone are mounted on a movable carriage, the gear rack 11 is fixed on its place and fastened either directly to frame of the machine or to the means for clamping of the central portion of the tube. In the other embodiment, the gear rack 11 is movable and rigidly connected to the movable carriage which pushes the tube forwards through the heating zone. The gear rack 11 is at least as long as the length $L_2$ of the displaced flexure axis. Since, on one hand, the bending arm 8 and the gear 10 are rigidly interconnected and, on the other hand, the gear rack 11 and the central portion of the tube are rigidly interconnected, the bending arm will determine the radius of the bend $R_1$. The radius $R_2$ of the gear again determines the length $L_2$ of the tube which is to be fed into the heating zone, causing more material to be fed to the bend than if the radius were $R_1$.

Within the scope of the claims, alternative embodiments are also conceivable. Thus, instead of the described gear and gear rack combination it is possible to use a hydraulic cylinder or a similar means for attenuating the circular movement of the bending arm. According to an alternative embodiment, the heating zone is moved a small distance towards the bent portion of the tube during the bending process. It has turned out that, at economical working speed, a somewhat inclined heating zone is generated trough the tube wall during induction heating of thick tubes. This problem can be eliminated by displacing the heating zone, e.g., from 10 to 30 mm.

What is claimed is:

1. A method for manufacturing stabilizer bars or similar tubular metallic products for vehicles, having a thick-walled metallic tube with a central portion and at least two bent portions forming legs, each leg of the tube forming an angle with the central portion of the tube, comprising the steps of:

fitting to a bending arm one end of the thick-walled metallic tube said tube having in the central portion a wall thickness and outside diameter in a ratio amounting to at least 1/10, said bending arm having an arm length and being adapted for making a pivotal bending movement about a predetermined center of curvature with respect to a given one of the bent portions the given one of the bent portions of the tube having an inside wall portion located radially inward toward the center of curvature, said inside wall portion being opposite an outside wall portion of said tube, said inside wall portion having a radial spacing from said center of curvature no greater than the arm length, heating in a heating zone, which is spaced from the center of curvature, a narrow band of the tube by means of induction heating to a temperature sufficient to achieve plastic deformation of the tube material, moving the tube and the heating zone in relation to each other by advancing the heating zone along the tube, narrow tube bands being successively heated and the tube being bent in response to circular movement of the bending arm, portions of said tube proximal said center of curvature being in compression and being separated from portions of said tube in tension along a flexure plane, resisting circular movement of the bending arm with a force sufficient to displace the flexure plane radially outward from the center of curvature and to thin the outside wall of the metallic tube by about 5 to 15%, by:

attenuating the circular movement of the bending arm by means of a gear mechanism comprised of a gear rigidly connected to the bending arm and a gear rack rigidly joined to the tube and cooperating with the gear, said gear having a radius selected to be larger than the average bending radius of curvature of the given one of the bent portions of the tube and continuing the relative movement of the tube in relation to the heating zone and continuing the heating and bending of successive portions of the tube for a predetermined length, the given one of the bent portions having an average bending radius of curvature in the range from about 1.4 to 2.1 times the outside diameter of the tube.

2. The method as claimed in claim 1, wherein the step of heating and bending is performed by simultaneously bending both ends of the tube by means of units arranged at both ends of the tube, each of said units comprising a bending arm, an induction heating zone and a carriage.

3. The method as claimed in claim 2, wherein the step of relatively moving the tube and heating zone is performed by moving both carriages by an at least approximately constant force directed toward the central portion of the tube.

4. The method as claimed in claim 1, wherein relative movement of the heating zone and the tube is achieved by fitting the bending arm and the induction heating zone on a carriage which is adapted for movement substantially longitudinally along the tube, immobilizing the central portion of the tube, and advancing the carriage towards the central portion of the tube.

5. The method as claimed in claim 4, wherein the step of heating and bending is performed by simultaneously bending both ends of the tube by means of units arranged at both ends of the tube, each of said units comprising a bending arm, an induction heating zone and a carriage.

6. The method as claimed in claim 4, wherein the step of relatively moving the tube and heating zone is performed by moving both carriages by an at least approximately constant force directed toward the central portion of the tube.

7. The method as claimed in claim 1, wherein movement of the heating zone in relation to the tube is achieved by fitting the tube on a carriage adapted for movement substantially longitudinally along the tube, fixing the bending arm to swing about a stationary point, and advancing the carriage towards the heating zone.

8. The method as claimed in any one of claims 1 to 7, wherein the step of heating and bending successive portions comprises:

displacing the heating zone at least somewhat in a leading direction away from the given one of the bent portions.

9. The method as claimed in one of the claims 1 to 8, 19 and 20 wherein the step of relatively moving the tube and heating zone is performed by means of a hydraulic cylinder.

10. An apparatus for manufacturing a stabilizer bar or a similar tubular metallic product for a vehicle, having a tube with a central portion and at least two bent portions which form legs each of the legs of the tube forming a bend angle with the central portion of the tube, the tube having an outside diameter at the central portion, the two bent portions having a central axis that is bent with an average bending radius of curvature in the range from about 1.4 to 2.1 times the outside diameter of the tube, said apparatus comprising a base on which means for bending the tube are mounted, wherein the means for bending the tube comprise:

tube clamping means mounted on the base for clamping the tube, at least one transport means arranged in connection with the base and adapted for linear movement along the base, an induction heating unit arranged on the transport means for forming a heating zone, a power source connected to the transport means for driving the transport means, a radial bending arm pivotally mounted on the transport means for providing circular movement about a center of curvature of one of the bent portions and being equipped with means for clamping one end of the tube, gear pivoted about the center of curvature and rigidly connected to the radial bending arm, said gear having a radius larger than the average bending radius of curvature of one of the bent portions of the tube, a gear rack connected to the base, cooperating with the gear and having a rack length, the bend angle subtending a circumferential length peripherally along said gear no greater than said rack length, portions of said tube proximal said center of curvature being in compression and being separated from portions of said tube in tension along a flexure plane, whereby, due to the cooperation of the gear and the gear rack, the flexure plane of the tube is, during the bending of the tube, movable in radial direction outwards from the center of curvature by a distance corresponding to the difference between the radius of the gear and the average bending radius of curvature of the bent portions, the ratio between the radius of the gear to the average bending radius of curvature of the bent portions being from about 1.05 to 1.2.

11. The apparatus as claimed in claim 10, comprising two transport means one on each side of the tube clamping means and adapted for movement toward the tube clamping means for bending of the tube.

12. An apparatus for manufacturing a stabilizer bar or a similar tubular metallic product for a vehicle, having a tube with a central portion and at least two bent portions which form legs, each of said legs forming a bend angle with the central portion of the tube, the tube having an outside diameter, the two bent portions being bent with an average bending radius of curvature in the range from about 1.4 to 2.1 times the outside diameter of the tube, said apparatus comprising a base on which means for bending the tube are mounted, wherein the means for bending the tube comprise:

- a transport means fitted on the base and adapted for linear movement along the base,
- means mounted on the transport means for clamping the tube which is to be bent,
- a power source connected to the transport means for driving the transport means,
- an induction heating unit arranged on the base for forming a heating zone,
- a radial bending arm pivotally mounted on the base for radial movement about a center of curvature of one of the bent portions and being equipped with means for clamping one end of the tube,
- a gear pivotally mounted about the center of curvature and rigidly connected to the radial bending arm and having a radius larger than the average bending radius of curvature of one of the bent portions of the tube,
- a gear rack connected to the transport means and cooperating with the gear and having a rack length, the bend angle subtending a circumferential length peripherally along said gear no greater than said rack length, portions of said tube proximal said center of curvature being in compression and being separated from portions of said tube in tension along a flexure plane, whereby due to the cooperation of the gear and the gear rack, the flexure plane of the tube is movable in a radial direction outwards from the center of curvature by a distance corresponding to the difference between the radius of the gear and the average bending radius of curvature of one of the bent portions, the ratio between the radius of the gear to the average bending radius of curvature of one of the bent portions being from about 1.05 to 1.2.

* * * * *